(No Model.)
J. W. CHAMBERS.
SELF ADJUSTING HEAD BLOCK FOR HAY PRESSES.
No. 259,269. Patented June 6, 1882.
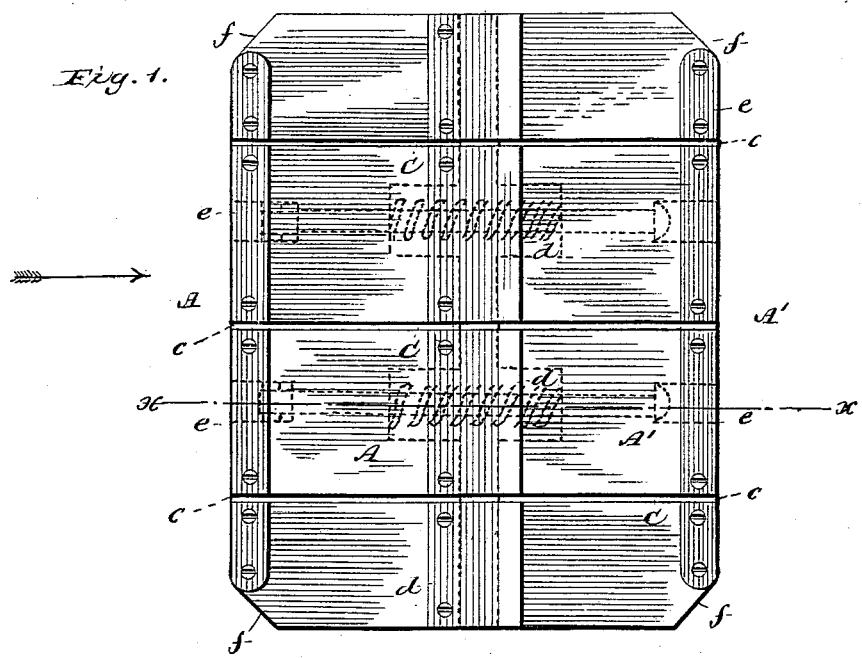
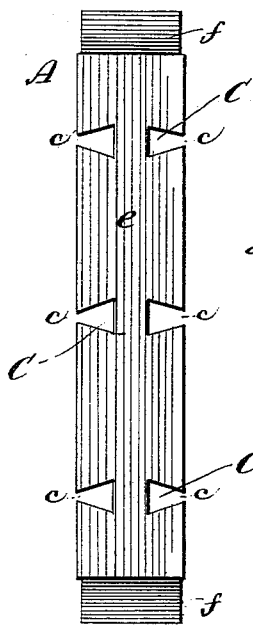
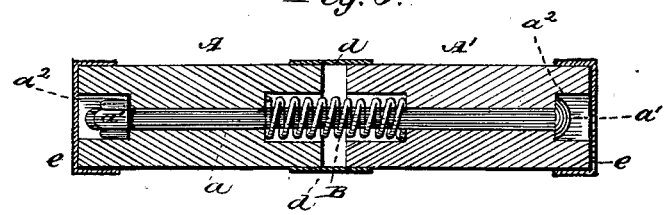
WITNESSES:
Fred. G. Dieterich
A. M. Long
John W. Chambers
INVENTOR,
by Louis Bagger & Co.
ATTORNEYS.

UNITED STATES PATENT OFFICE.

JOHN W. CHAMBERS, OF BOULDER, COLORADO, ASSIGNOR OF ONE-HALF TO AMANDA E. CAMPBELL, OF SAME PLACE.

SELF-ADJUSTING HEAD-BLOCK FOR HAY-PRESSES.

SPECIFICATION forming part of Letters Patent No. 259,269, dated June 6, 1882.

Application filed April 10, 1882. (No model.)

*To all whom it may concern:*

Be it known that I, JOHN WALLACE CHAMBERS, of Boulder, in the county of Boulder and State of Colorado, have invented certain new and useful Improvements in Self-Adjusting Head-Blocks for Hay-Presses; and I do hereby declare that the following is a full, clear, and exact description of the invention, which will enable others skilled in the art to which it appertains to make and use the same, reference being had to the accompanying drawings, which form a part of this specification, and in which—

Figure 1 is a plan view of my improved head-block or follower for baling or hay presses. Fig. 2 is a side view of the same, looking in the direction of the arrow; and Fig. 3 is a cross-section through line $x\ x$ in Fig. 1.

Similar letters of reference indicate corresponding parts in all the figures.

This invention relates to improvements in head-blocks for hay or baling presses, having principally for its object to accommodate the block to the varying width of the press-chamber from the entrance to the delivery end of the chamber, and to provide for the ready and easy application of the binding or baling wire; and it consists in constructing the follower so as to be capable of adapting itself as aforesaid stated, and with gains or grooves that permit of the ready insertion of the wire, and just of sufficient size at their open sides to allow of the passage of the wire and keep out the hay, substantially as hereinafter more fully set forth and claimed.

In carrying out my invention I employ a follower or head-block, which I construct in two parts, A A', which are connected together by and adapted to slide or move toward or away from each other upon rods or bolts $a$, with their heads $a'$ working in enlargements $a^2$ of the sockets or passages which receive the said bolts or rods. These parts are exposed to the action of springs B, interposed between them and placed upon said rods, their maximum expansion spreading or separating said parts just sufficiently to enable the follower or block to fit snugly and press slightly against the sides of the press-chamber. The parts or blocks A A' are capable of being compressed or reduced sufficiently to permit of their passage out through the smaller or delivery end of the chamber or press, it being understood that the press-chamber is made tapering. It will therefore be seen that the block or follower will fill the entire width of the press-chamber, from its entrance throughout its entire length to the delivery end thereof, during the baling process, thus leaving no space around or at either side of the follower or head-block for the wedging of the hay therein, as is the case with head-blocks of a size to pass out the smaller end of the press.

Transversely cut in the head-block or follower A A' are a number of gains or grooves, C, arranged, as usual, one above the other, for insertion of the bale-wires. These grooves are of a dovetail form in cross-section, with their converging sides left open, as at $c$, just sufficiently to permit of the exit or passage between them of the wire in passing it to and around the bale, while their inner portions are of a size that will permit of the ready and easy insertion of the wire therein. By reducing size of the wire exit openings $c$ of the grooves to a minimum, the possibility of the hay getting into them and interfering with the effective and expeditious baling or binding of the hay is overcome. The intermediate opening between the parts A and A' of the head-block is guarded, to prevent the entrance of hay, by plates $d$, fastened to one section or part only, and covering or overlapping the said opening. Upon the side ends of the head-block are fastened plates $e$, to arm it at those points and lapping its sides.

To prevent the corners of the head-block from "binding" in the press-chamber, the corners are cut off or beveled, as shown at $f$, and by making the gains or dovetailed grooves $c$ C on both sides of the block it will make no difference which side faces the hay to be baled.

I claim and desire to secure by Letters Patent of the United States—

1. The head-block or follower A A', composed of two parts adapted to slide upon rods or bolts, and held apart by springs, substantially as and for the purpose set forth.

2. The parts A and A' of a head-block, with the intervening spaces between them covered by guard-plates $d$, fastened only to one part, substantially as and for the purpose set forth.

In testimony that I claim the foregoing as my own I have hereunto affixed my signature in presence of two witnesses.

JOHN WALLACE CHAMBERS.

Witnesses:
G. BERKLEY,
H. E. WASHBURN.